United States Patent
O'Neill

(10) Patent No.: US 7,564,824 B2
(45) Date of Patent: Jul. 21, 2009

(54) METHODS AND APPARATUS FOR AGGREGATING MIP AND AAA MESSAGES

(75) Inventor: Alan O'Neill, Henley Beach (AU)

(73) Assignee: QUALCOMM Incorporated, San Diego, CA (US)

( * ) Notice: Subject to any disclaimer, the term of this patent is extended or adjusted under 35 U.S.C. 154(b) by 759 days.

(21) Appl. No.: 10/430,166

(22) Filed: May 6, 2003

(65) Prior Publication Data

US 2004/0047348 A1     Mar. 11, 2004

Related U.S. Application Data

(63) Continuation-in-part of application No. 10/357,265, filed on Feb. 3, 2003, now Pat. No. 6,785,256.

(60) Provisional application No. 60/378,404, filed on May 7, 2002, provisional application No. 60/354,195, filed on Feb. 4, 2002.

(51) Int. Cl.
*H04W 4/00* (2006.01)

(52) U.S. Cl. .................. 370/338; 370/389; 370/401; 455/433

(58) Field of Classification Search ............... 370/389, 370/338, 252, 254, 351, 390, 400, 401; 455/432.1, 455/433, 436
See application file for complete search history.

(56) References Cited

U.S. PATENT DOCUMENTS

| | | | |
|---|---|---|---|
| 4,833,701 A | 5/1989 | Comroe et al. | |
| 5,267,261 A | 11/1993 | Blakeney, II et al. | |
| 5,491,835 A | 2/1996 | Sasuta et al. | |
| 5,572,528 A | 11/1996 | Shuen | |
| 5,594,948 A | 1/1997 | Talarmo et al. | |
| 5,901,362 A | 5/1999 | Cheung et al. | |
| 6,006,090 A | 12/1999 | Coleman et al. | |
| 6,097,966 A | 8/2000 | Hanley | |
| 6,137,791 A | 10/2000 | Frid | |
| 6,144,671 A | 11/2000 | Perinpanathan et al. | |

(Continued)

FOREIGN PATENT DOCUMENTS

WO     95/12297     5/1995

(Continued)

OTHER PUBLICATIONS

PCT International Search Report for International Application No. PCT/US03/14338, May 7, 2003.

(Continued)

*Primary Examiner*—Kevin C Harper
*Assistant Examiner*—Mon Cheri S Davenport
(74) *Attorney, Agent, or Firm*—Michael P. Straub; Kam T. Tam

(57) ABSTRACT

Aggregated signaling methods and apparatus which can be used to support the aggregation of Mobile IP binding registration information corresponding to multiple forwarding tunnels are described. Aggregated binding update message are used to enable multiple home addresses from one or more home agents to be installed, refreshed and deleted using a single MIP signaling phase. The single MIP signaling phase may correspond to a single MIP binding update message. Aggregated message techniques can also be used to retrieve multiple home address specific policy profiles via AAA signaling thereby reducing the number of AAA messages required to retrieve AAA information, e.g., profiles, corresponding to multiple home addresses.

64 Claims, 7 Drawing Sheets

U.S. PATENT DOCUMENTS

| | | | |
|---|---|---|---|
| 6,161,008 | A | 12/2000 | Lee et al. |
| 6,195,705 | B1 | 2/2001 | Leung |
| 6,256,300 | B1 | 7/2001 | Ahmed et al. |
| 6,298,234 | B1 | 10/2001 | Brunner |
| 6,308,267 | B1 | 10/2001 | Gremmelmaier |
| 6,366,561 | B1 | 4/2002 | Bender |
| 6,400,722 | B1 | 6/2002 | Chuah et al. |
| 6,434,134 | B1 | 8/2002 | La Porta et al. |
| 6,445,922 | B1 | 9/2002 | Hiller et al. |
| 6,446,127 | B1 | 9/2002 | Schuster et al. |
| 6,449,234 | B1 | 9/2002 | Ahn et al. |
| 6,466,964 | B1 | 10/2002 | Leung et al. |
| 6,496,505 | B2 | 12/2002 | La Porta et al. |
| 6,510,153 | B1 | 1/2003 | Inoue et al. |
| 6,539,225 | B1 | 3/2003 | Lee |
| 6,563,919 | B1 | 5/2003 | Aravamudhan et al. |
| 6,578,085 | B1 | 6/2003 | Khalil et al. |
| 6,611,547 | B1 | 8/2003 | Rauhala |
| 6,621,810 | B1* | 9/2003 | Leung ........................ 370/338 |
| 6,763,007 | B1 | 7/2004 | La Porta et al. |
| 6,842,456 | B1* | 1/2005 | Chen et al. .................. 370/401 |
| 6,862,446 | B2 | 3/2005 | O'Neill et al. |
| 6,947,401 | B2* | 9/2005 | El-Malki et al. ............ 370/331 |
| 6,992,994 | B2 | 1/2006 | Das et al. |
| 6,992,995 | B2 | 1/2006 | Agrawal et al. |
| 6,999,437 | B2* | 2/2006 | Krishnamurthi et al. .... 370/331 |
| 7,136,362 | B2* | 11/2006 | Chen ........................... 370/328 |
| 7,136,365 | B2* | 11/2006 | Nakatsugawa et al. ...... 370/331 |
| 7,136,389 | B2 | 11/2006 | Shahrier et al. |
| 7,227,863 | B1 | 6/2007 | Leung |
| 7,277,948 | B2 | 10/2007 | Igarashi et al. |
| 7,301,952 | B2 | 11/2007 | Furukawa et al. |
| 2001/0016492 | A1* | 8/2001 | Igarashi et al. .............. 455/433 |
| 2001/0036164 | A1 | 11/2001 | Kakemizu et al. |
| 2001/0041571 | A1 | 11/2001 | Yuan et al. |
| 2001/0046223 | A1 | 11/2001 | Malki et al. |
| 2002/0009066 | A1* | 1/2002 | Shimizu et al. ............. 370/338 |
| 2002/0015396 | A1 | 2/2002 | Jung |
| 2002/0018456 | A1 | 2/2002 | Kakemizu et al. |
| 2002/0026527 | A1 | 2/2002 | Das et al. |
| 2002/0055971 | A1 | 5/2002 | Shahrier et al. |
| 2002/0068565 | A1 | 6/2002 | Pumadi et al. |
| 2002/0136226 | A1 | 9/2002 | Christoffel et al. |
| 2002/0147820 | A1 | 10/2002 | Yokote |
| 2002/0191593 | A1 | 12/2002 | O'Neill et al. |
| 2003/0012179 | A1 | 1/2003 | Yano et al. |
| 2003/0060199 | A1 | 3/2003 | Khalil et al. |
| 2003/0123421 | A1 | 7/2003 | Feige |
| 2003/0137961 | A1 | 7/2003 | Tsirtsis et al. |
| 2003/0137991 | A1 | 7/2003 | Doshi et al. |
| 2003/0176188 | A1 | 9/2003 | O'Neill |
| 2003/0214922 | A1 | 11/2003 | Shahrier |
| 2003/0228868 | A1 | 12/2003 | Turanyi et al. |
| 2004/0018841 | A1 | 1/2004 | Trossen |
| 2004/0024901 | A1 | 2/2004 | Agrawal et al. |
| 2004/0090942 | A1* | 5/2004 | Flinck ........................ 370/338 |
| 2004/0148428 | A1* | 7/2004 | Tsirtsis ....................... 709/238 |

FOREIGN PATENT DOCUMENTS

| | | |
|---|---|---|
| WO | PCT/US98/47302 | 10/1998 |

OTHER PUBLICATIONS

C. Perkins, Editor "IP Mobility Support", Network Working Group, pp. 1-79 (Oct. 1996).

Li, Yalun "Protocol Architecture for Universal Personal Computing" IEEE Journal on Selected Areas in Communications 15(8): 1467-1476 (1997).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Informatin Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2210, The Use of RSVP with IETF Integrated Services, pp. 1-31 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

J. Moy, Editor, "OSPF Version 2", Network Working Group, pp. 1-244 (Apr. 1998).

Valko, Andras "Cellular IP: A New Approach to Internet Host Mobility" Computer Communications Review 29(1): 50-65 (1999).

Andras G. Valko, "Cellular IP—A New Approach to Internet Host Mobility," ACM Computer Communication Review, vol. 29, No. 1, pp. 50-65, Jan. 1999.

TIA/EIA/IS-707A.8 "Data Service Options for Spread Spectrum Systems: Radio Link Protocol Type 2" pp. 1-1:4:12 (Mar. 1999).

Karagiannis, Mobile IP, State of the Art Report, pp. 1-63, Jul. 1999.

Elin Wedlund et al., "Mobility Support Using SIP", Proc. Of ACM/IEEE International Conference on Wireless and Mobile Multimedia (WoWMoM '99), Seattle, Washington, Aug. 1999.

Henning Schulzrinne et al., "Application-Layer Mobility Using SIP", 0-7803-7133 IEEE, pp. 29-36, Jan. 2000.

"Source Specific Multicast (SSM) Explicit Multicast (Xcast)" pp. 1-27 (Copyright 2001 by ETRI).

IETF Network Working Group, Request for Comments: 2961, RSVP Refresh Overhead Reduction Extensions, pp. 1-32 (Apr. 2001).

Marshall, W., et al., Integration of Resource Management and SIP, IETF Internet Draft, draft-ietf-sip-manyfolks-resource-02.txt, Aug. 2001, pp. 1-28.

Andrew T. Campbell et al., "IP Micro-Mobility Protocols", ACM SIGMOBILE Mobile Computer and Communication Review (MC2R), vol. 4, No. 4, pp. 34-54, Oct. 2001.

S. Zhou et al., "A Location Management Scheme for Support Mobility In Wireless IP Networks Using Session Initiation Protocol (SIP)", 1531-2216/01 IEEE, Oct. 2001, pp. 486-491.

Bos, L., et al., A Framework for End-to-End Perceived Quality of Service Negotiation, IETF Internet Draft, draft-bos-mmusic-sdpqos-framework-00.txt, Nov. 2001, pp. 1-22.

Papalilo, D., et al., Extending SIP for QoS Support www.coritel.it/publications/IP_download/papalilo-salsano-veltri.pdf, Dec. 8, 2001, pp. 1-6.

Camarillo, P., et al., Integration of Resource Management and SIP, IETF Internet Draft, draft-ietf-sip-manyfolks-resource-04.ps, Feb. 25, 2002 pp. 1-18.

Ho, Integration AAA with Mobile IPv4, Internet Draft, pp. 1-59, Apr. 2002.

"SIP: Session Initiation Protocol", IEFT Network Wording Group, Request for Comments: 3261 (Jun. 2002), pp. 1-29.

IETF, Network Working Group, Request for Comments: 3261 "SIP: Session Initiation Protocol", pp. 1-269 (printed as pp. 1-252) (Jun. 2002).

Network Working Group, IPv6 Prefix Delegation Using ICMPv6, pp. 1-33, Apr. 2004.

IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.

Network Working Group, "IP Mobility Support for IPv4", C. Perkins, Ed., Nokia Research Center, Jan. 2002, downloaded from http://www.ietf.org on Dec. 29, 2004, pp. 1-92.

International Search Report-PCT/US03/014199, International Search Authority European Patent Office, Sep. 24, 2003.

International Search Report-PCT/US03/014193, International Search Authority European Patent Office, Aug. 19, 2003.

\* cited by examiner

METHODS AND APPARATUS FOR AGGREGATING MIP AND AAA MESSAGES

RELATED APPLICATIONS

The present application claims the benefit of U.S. Provisional Patent Application Ser. No. 60/378,404 filed May 7, 2002 entitled: "COMMUNICATIONS METHODS AND APPARATUS" and is a continuation-in-part of U.S. patent application Ser. No. 10/357,265 filed Feb. 3, 3003 now U.S. Pat. No. 6,785,256 entitled: "A METHOD FOR EXTENDING MOBILE IP AND AAA TO ENABLE INTEGRATED SUPPORT FOR LOCAL ACCESS AND ROAMING ACCESS CONNECTIVITY" which claims the benefit of U.S. Provisional Patent Application Ser. No. 60/354,195 filed Feb. 4, 2002 entitled: "A METHOD FOR EXTENDING MOBILE IP TO ENABLE INTEGRATED SUPPORT FOR LOCAL ACCESS AND ROAMING ACCESS CONNECTIVITY", each of the preceding applications are expressly incorporated by reference into the present application.

FIELD OF THE INVENTION

The present invention is directed to methods and apparatus for supporting mobile communications and, more specifically, to methods and apparatus for using aggregated binding update messages and aggregated authentication, authorization and/or accounting messages to reduce message signaling in a mobile communications system.

BACKGROUND

Mobile IP (IETF RFC2002) enables a moving Internet host to connect to a Foreign Agent (FA) access router in a foreign network, yet still be contactable on its persistent Host Home Address (HoA) that it uses on its home network and is likely included in the DNS (Domain Name Server) system. This is possible because the FA gives the host a temporary local address that is either unique to the host e.g., a Co-located Care of Address (CCoA), or is unique to the FA, e.g., a Care of Address (CoA). In an exemplary scenario, the FA registers its CoA into the Home Agent (HA) for the HoA address of its attached Mobile Node (MN) which corresponds to a user, e.g., a Caller. The HA then tunnels packets addressed to HoA of Caller to the Care of Address (CoA) of the FA. The FA forwards packets received from the MN HoA out to the Internet as normal. The Caller needs a Security Association (SA) with the HA and the FA, whilst the FA has a Security Association with the HA, to allow the signaling to be authenticated and potentially encrypted.

During a hand-off, the new FA changes the binding in the HA for the HoA to now map to the new CoA of the new FA. Complexity and problems arise when multiple network regions are involved in a hand-off, e.g., because an end node is outside its home network region requiring signals to be communicated from one region to another so that a mobile node's Home Agent can be informed of the information, e.g., address information, needed to reach the mobile node in the foreign network region. For policy and other reasons local and remote network access may be handled differently particularly when a mobile node is in a foreign region. The need, in many cases, to treat local and remote packet forwarding operations differently further complicates matters in regard to updating of forwarding information included in various network nodes.

FIG. 1 shows prior art MIP signaling between a first node 140 and a second node 150. A MIP Registration Request/Binding Update (RREQ/BU) message 180 is sent between the first node 140 and the second node 150 to install a binding in the second node that contains a mapping between the home address of an end node and the Care of Address of that end node. The home address is allocated to the end node out of an address prefix assigned to a home agent of the end node. The registration enables the second node 150/first node 140 to redirect packets addressed to the home address of the end node, between the second node 150/first node 140 and the first node 140/second node 150 as indicated by bi-directional IP packet flows for HoA1 182. The registration request message 180 has a MIP Registration Response/Binding Update Acknowledgement (RREP/BUack) message 181 which confirms that the binding has been installed and reports the nature of any errors. Messages 180 and 181 are specific to the Home address 1 (HoA1) of the end node from the home agent 1 (HA1) to be mapped to the CoA of the end node. Therefore, a different RREQ/BU message 184 and a different RREP/BUack message 185 are required to install the binding for home address 2 (HoA2) of the end node from home agent 1 (HA1) to be mapped to the CoA of the end node, so creating bi-directional IP packet flows for HoA2 186 between first node 140 and second node 150. Similarly, a RREQ/BU messages 187 and a RREP/BUack message 188 are required to install the binding for home address 3 (HoA3) of the end node from home agent 2 (HA2) to be mapped to the CoA of the end node, so creating bi-directional IP packet flows for HoA3 189 between first node 140 and second node 150. The first node 140 may be any of an end node, an access node containing a MIP agent such as a foreign agent or attendant, whilst the second node 150 can be an access node containing a MIP agent such as a foreign agent or attendant, or it may be a MIP home agent. It may be seen from FIG. 1 that when the end node has multiple home addresses that a significant amount of signaling is required to install and manage the bindings for an end node, especially during hand-off between access nodes.

FIG. 3 shows detailed contents 380 of a prior art MIP registration message 380, such as, for example message 180 or message 181 of FIG. 1. Message 380 includes a home agent address (HA1) 381, a single home address 1 (HoA1) 382 with a first prefix 382a that is allocated to and routable through the home agent using address 381. The message further includes a CoA of the end node 383 which is mapped with the home address 382 in a MIP binding. Finally, the prior art message includes MIP signaling fields 384 that contains additional signaling information such as flags, sequence numbers, security and prior art MIP extension fields etc used for correct operation of the signaling instance and to describe the type of processing and forwarding to be established for the binding between the home address 382 and the CoA 383 in a MIP mobility agent such as a home or foreign agent. Note that during an initial registration phase, the home address and home agent addresses may be undefined to indicate that the AAA system should dynamically allocate a home agent to the end node, and the AAA system or home agent should allocate a home address to the end node from a prefix at that home agent. Known MIP registration message do not include more than a single HoA.

For the purposes of the description, an address is associated with an address prefix of N bit length if that N Most Significant Bits of the prefix and that address are the same. In addition, whilst a single MIP signaling instance is already able to manage the allocation of multiple home addresses from a single Home Agent, this is only possible if those addresses are defined as a single subprefix of length M bits out of an N bit prefix managed by the Home Agent (where N<=M). Non-congruent addresses cannot be supported and specifically a single MIP signaling instance cannot manage home addresses from different Home Agent prefixes, nor in fact from different prefixes at different Home Agents.

Therefore, existing Mobile IP (MIP) does not provide efficient support for multiple Home addresses, to support say both remote and local models concurrently via the use of two different Home addresses so that, e.g., a user can roam the Internet through the use of local access while in a foreign network region and also get corporate/home access at the same time via the use of remote access to the user's home network region. The need for this kind of duality has been seen previously, for example, on DSL Digital Subscriber Line access networks, so the requirement is not new. For example, a user might wish for either component to be started or dropped at any time and with full policy control by both the foreign and home operators as to what is allowed. The MN could then use an address (HoA) associated with the particular mobile which corresponds to the mobile's Home Agent node, an address (RoA) associated with the particular mobile that corresponds to the mobile's Regional Agent (RA) node in combination with packet source address information to select on a flow by flow basis to route packets and hence control connectivity features (location visibility, identity visibility and routing policy) for each users IP 'session' independently.

In order to support different routing and treatment for different IP sessions or applications, e.g., corresponding to remote and local access, running on a mobile node, it may be necessary to run multiple instances of MIP on the mobie resulting in multiple HoA's being assigned to the same mobile and, using existing signaling, requiring at least one MIP registration message for each HoA corresponding to a mobile. This has the unfortunate effect of resulting in multiple MIP registration update messages having to be sent by a mobile, e.g., one per HoA or RoA being used, when a handoff occurs. Multiple MIP registration messages can have the unfortunate consequence of consuming bandwidth and signaling resources that might otherwise be used.

FIG. 5 shows a prior art binding table 580 in a mobility agent. A separate MIP signaling instance, e.g., MIP registration request message and reply, is used to update or create a single entry in the binding table 580. The table 580 has entries for a multitude of end nodes such as Mobile Node X 581 and Mobile Node Y 582. In the case of MN X which has three home addresses HoA1 587, HoA2 591 and HoA 3 595, the prior art signaling creates a binding entry for each MIP signaling instance and hence for each HA/HoA address pair. Entry 583 contains HA1 586, HoA1 587, MN X CoA 588 and MIP signaling state 589 associated with that signaling instance. Entry 584 contains HA1 590, HoA2 591, MN X CoA 592 and MIP signaling state 593 associated with that signaling instance. Thus, for each HA, HoA pair, there is a separate entry 583, 584, 585 resulting in similar information being stored multiple times in the memory used to implement the binding table. Entry 585 contains HA2 594, HoA3 595, MN X CoA 596 and MIP signaling state 597 associated with that signaling instance. It is clear that CoAs 588, 592 and 596 have the same value, that being the CoA of the MN X, and HAs 586 and 590 contains the same HA address. Further, if the forwarding and security requirements, of the MN X, is the same for each binding entry, then the signaling state 589, 593 and 597 is highly correlated and can be exactly the same through appropriate use of common lifetimes, security associations and sequence numbers. Therefore there is the potential for large amounts of redundancy in the stored state that implies inefficient storage and associated messaging.

FIG. 7 shows prior art AAA signaling between an access node 740 and a AAA server 750 that is triggered by the arrival of a connect message such as a MIP Registration message at the access node 740. The AAA signaling is used to authenticate an end node for connection to the access node 740, and to authorize a set of communications services for the end node at that access node 740, and potentially a plurality of additional access nodes, as defined by an end node profile associated with the home address of an end node. The end node profile is stored in the access node 740 and used to configure and policy communication facilities at that access node 740. A AAA request message 760 is sent from access node 740 to AAA server 750 and contains the end node identity such as a MN X Network Access Identifier (NAI) 761 which also used to route the AAA request to the home AAA server of the end node. The message 760 will also contain MIP AAA request state used to request dynamic allocation of HA, HoA and security associations for the MIP service. The AAA request message 760 may also contain HA1 address 763 and HoA1 address 764 if the MN X has multiple profiles, each associated with a specific HA/HoA pair. HA1 address 763 and HoA1 address 764 can alternatively contain requirements on the AAA server for the dynamic allocation of a HA1 and/or a HoA1, such as address types and location to ensure the appropriate connectivity and communications facilities become available to the MN X. A AAA response message 770 will then contain the MN X identity NAI 761 to ensure that the returned state is installed for the correct MN X. Dynamically assigned HA1 address 772 and HoA1 address 773 will also be returned but may, especially in the case of statically allocated HA and HoA addresses, be returned in the MN X profile for HoA1 775, along with the configuration and other policy state. Finally, the message 770 will typically include other MIP AAA response state 774 such as dynamically allocated security associations. Now when MN X has multiple HoAs 1, 2 and even 3, then the address are from different address prefixes (same or different Home agents) and therefore represent different connectivity and hence reachability for communciations services, which is essentially the motivation for a MN X having such multiple Home addresses. HoA1 might be from a public Internet service provider whilst HoA 2 might be from a corporate network connected to the same network operator, and hence potentially reachable via a common Home agent HA1. HoA3 in contrast might be from a third party content provider that is not part of the common network operator for HoA1/2 and hence is reachable via a second Home agent HA2. In these cases, it is clear that different reachability is likely to be associated with different MN X profiles for each HoA. Therefore, the prior art AAA signaling will require additional AAA Request message 780 and AAA Response message 781 to fetch the dynamic configuration and MN X profile for HoA2 , and a third set of messages 782 and 783 to fetch the state for HoA3. Clearly, if the AAA server is common for all three AAA signaling instances, and part of the MN X profile state is common to more than a single HoA, then this approach is inefficient in storage and signaling bandwidth.

In light of the above discussion, it is clear that a better and more efficient method with supporting apparatus is needed to provide efficient support for multiple Home Addresses in MIP signaling.

SUMMARY OF THE INVENTION

In accordance with the invention, mobile node functionality is enhanced by supporting multiple parallel instances of MIP in a single mobile node. This allows local and remote access to be treated differently allowing for greater flexibility in network system policy, accounting, security and other issues that arise when a mobile node operates in a visited network region, e.g., foreign domain. While in a visited region, e.g., a foreign domain, local access refers to access within the visited region or domain. This may involve sending packets to, or receiving packets from, another end node located in the visited network region. Remote access may involve a mobile node in a visited network region accessing or exchanging packets with one or more nodes in the mobile node's home network region. In accordance with the present invention, this can be accomplished by running a separate instance of MIP in the mobile to deal with remote access separately from local access.

Thus, in accordance with the invention a mobile node may run parallel instances of MIP, one for each Home address. One instance used for local access may use a local HA (Home Agent) and HoA (Home Address), e.g., HA1 and HoA1. Remote Access may be supported via another, e.g., remote HA and a remote HoA, e.g., HA2 and HoA2. This gives the mobile node independent control of each MIP instance and its particular standard MIP features such as reverse tunneling, broadcasting etc, and can select between the two instances on a per IP session basis using source address selection. The distinct connectivity planes are both exposed to the local operator who can now manage and account both services. Either plane can be dropped and added as desired although a degree of persistence in the local configuration is desirable to avoid thrashing the AAA system and MIP signalling plane.

However, without various signaling improvements to MIP which are taught in the present application, the problems with this model can be severe in terms of the amount of MIP signaling which may occur, particularly as the number of parallel instances of MIP on individual mobile devices increases.

Absent various features of the invention, ultiple, e.g., independent, parallel MIP instances in the mobile naturally implies at least double the signaling, hand-off processing, security associations and management load due to two or more independent MIP instances, particularly where there is no or only partial integration of the AAA (Authentication, Authorization and Accounting) data for each instance. The more HoAs a MN has then the worse the hand-off overhead and complexity becomes.

Using separate MIP signals as opposed to aggregated signals, each HoA specific hand-off may complete at significantly different times (out of phase) with each other and the local HA hand-off due to the different hand-off paths resulting in complex FA and MN state management. Normally local hand-off signaling can be completed before remote region hand-off signaling completes due to shorter path lengths relative to the mobile node and the network nodes which are updated. This can result in slow hand-off and chained FAs out of step with the local hand-off. A regional mobility agent can be deployed locally, e.g., in the visited region, in accordance with one feature or the invention provide the necessary localization for the remote access MIP hand-off.

Some ways of addressing some of the problems discussed above associated with multiple Home Addresses in MIP signaling, in accordance with various features of the invention, include:

a) A single phase of AAA exchanges through the foreign and home AAA servers that is used to configure both local and remote service options in parallel by returning a composite service profile covering both local and remote access, along with any dynamic IP addresses and security associations for HA, RN, HoA and RoA, where the HoA is an address associated with the specific MN at the HA and the RoA is an address associated with the specific mobile at the RN. For purpose of explaining the invention, a Regional Node (RN) is a node which operates as a regional mobility agent in a visited region. An RN may be implemented as an HA in a visited region but is described herein as an RA to distinguish from a node's HA in its home domain. A Gateway Foreign Agent is an example of a known RN. Notably, the RoA and HoA correspond to the same mobile node and are not shared with other mobile nodes allowing the RoA and HoA addresses to be mapped to a specific mobile node and serve as a mobile node identifier.

b) A single phase of MIP hand-off signalling can be used in accordance with the invention between the MN and FA, and between the new and old FAs to hand-off traffic to the newFA. This would signal the new CoA for multiple, e.g., all the HoAs of a MN and install standard inter-FA forwarding. This would enable the MN and the FAs to share the same Security Associations (SAs) for all the HoAs of a MN. Each oldFA (oFA) would store the last MIP reg sent to each HA and would CT (Context Transfer) these to the newFA (nFA) on hand-off. The newFA would then be responsible for issuing the proxy parallel MIP registrations to multiple, e.g, all, the HAs, secured by the nFA-HA and oFA-HA SA. Each such registration may and normally does include the old CoA and new-CoA info and the present binding information at the HA to be updated to the newCoA. The nFA may, and often is, also responsible for clearing up if the MN hands-off again before the remote access MIP registration, for the HA/HoA, is completed towards that newFA.

In accordance with the invention various novel aggregated messages are used to manage Mobile IP bindings for multiple home addresses of an end node. This reduces signaling requirements as compared to using multiple conventional MIP messages to perform the same or similar functions. Aggregated messages of the present invention, in contrast to convention MIP messages, carry multiple home addresses from the same home agent. These aggregated messages can be used between the end node and the home agent, between the end node and the foreign agent, between the foreign agent and the home agent and between two foreign agents during a hand-off. The invention is further directed to aggregated messages that enable bindings to be updated in a foreign agent for multiple home addresses that originate from different home agents. Novel aggregated AAA messages are also supported.

The invention is also directed to methods and apparatus for using and processing the novel messages of the present invention. The novel methods include a message de-aggregation, e.g., fan-out process, that may be implemented in the foreign agent that enables different messages to be generated and sent to multiple home agents as a result of a single aggregated message from an end node received at the foreign agent. The received aggregated message will normally include home addresses from, e.g., corresponding to, multiple different home agents which provide a mobility service to the mobile with which the aggregated message is associated. In support of the invention, and to reduce binding table requirements in various nodes, a novel aggregated binding table structure is also supported. In addition to reducing memory requirements, the aggregated binding table structure of the present invention is well suited for being updated by the aggregated MIP registration messages of the present invention.

The invention further provides aggregated messages between the foreign agent and the AAA server that can be triggered by an aggregated message from an end node to be used to fetch multiple home address specific end node profiles from the AAA server. Thus, novel aggregated authentication, authorization and/or accounting messages are also supported. Novel aggregated AAA messages normally included multiple HoAs corresponding to the same mobile node. The aggregated accounting messages reduce signaling overhead while enabling the end node to rapidly configure policy and connectivity for multiple home addresses in parallel. Use of a single aggregated message also operates to ensure that the AAA system receives requests and/or information corresponding to a hand-off together thereby avoiding problems from receiving information associated with a hand-off in different messages, some of which may be delayed or lost resulting in the potential for incomplete or inconsistent processing relating to a hand-off by the AAA system. The novel aggregated AAA message can also be used between foreign agents, as part of a hand-off, to transfer policy state between the old and new foreign agents for the multitude of home addresses employed by an end node.

Various other features of the present invention are directed to a HoA list extension that is used to indicate the additional HoAs that are associated with a master HA/HoA pair included in an aggregated signaling message. Further, a HA/HoA list extension is defined and supported. The HA/HoA list extension is used to indicate one or more additional HoAs at one or more alternative HAs which differ from the master HA of a signaling message. Both extensions may use INCLUDE/EXCLUDE flags to indicate whether the HA/HoA identified in the extension entry is to be installed (refreshed) or not refreshed (deleted). Thus, updates to a binding table may be applied selectively to HA/HoA information listed in the binding table. Thus, use of an aggregated registration message of the present invention does not necessarily result in updating of all binding entries corresponding to HA and/or HoA addresses included in the aggregated message of the invention.

Various additional features and benefits of the present invention will be apparent in view of the detailed description which follows.

DETAILED DESCRIPTION

Figure 1:
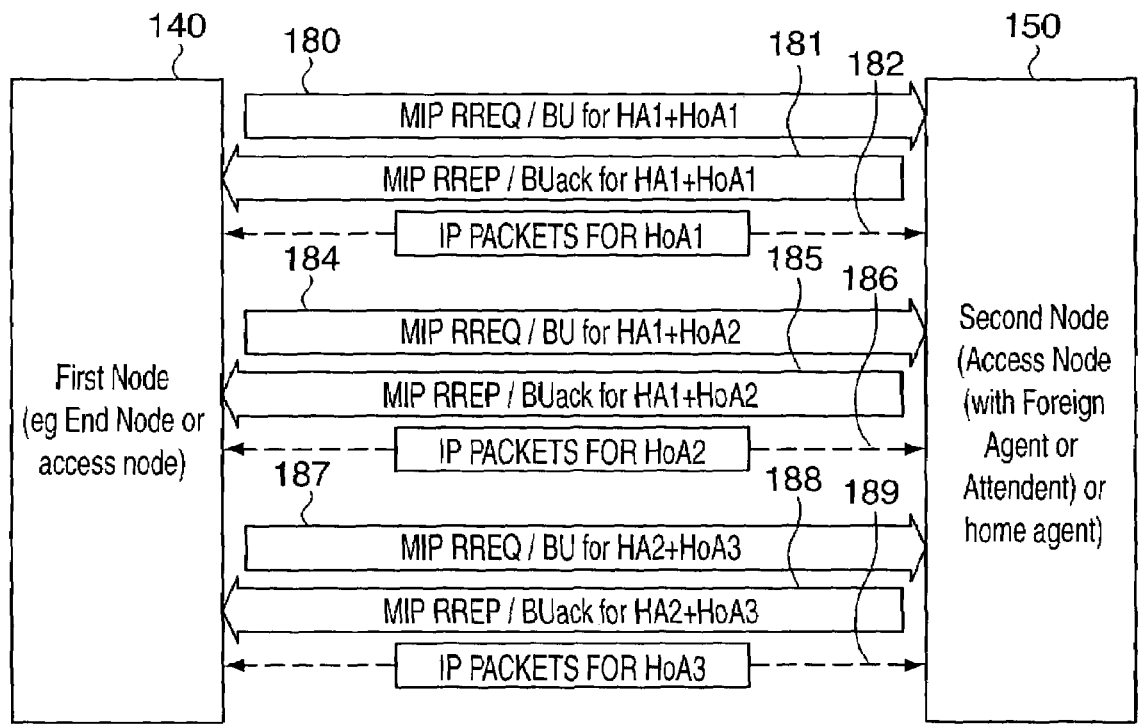
FIG. 1 shows three prior art MIP signaling instances between a first node and a second to manage the bindings for three separate Home addresses.
Figure 2:
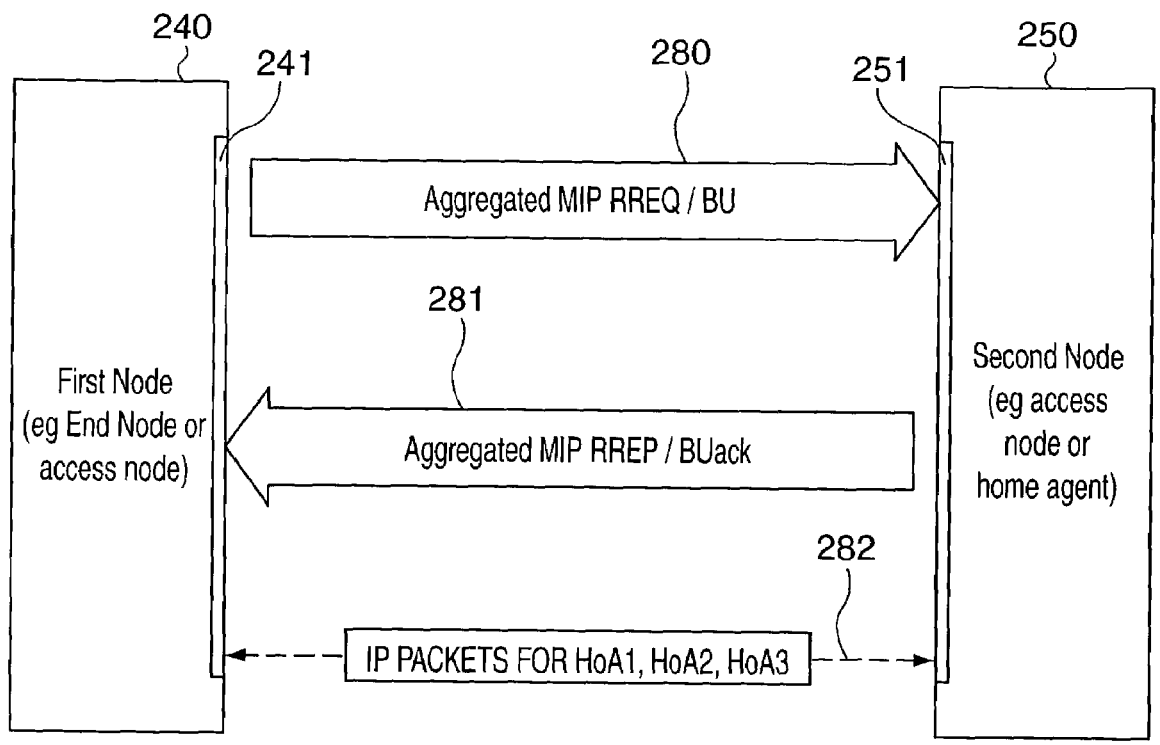
FIG. 2 shows a single aggregated MIP signaling instance of the invention, between the first node and the second node, for managing the bindings for three Home Addresses at the same time.
Figure 3:
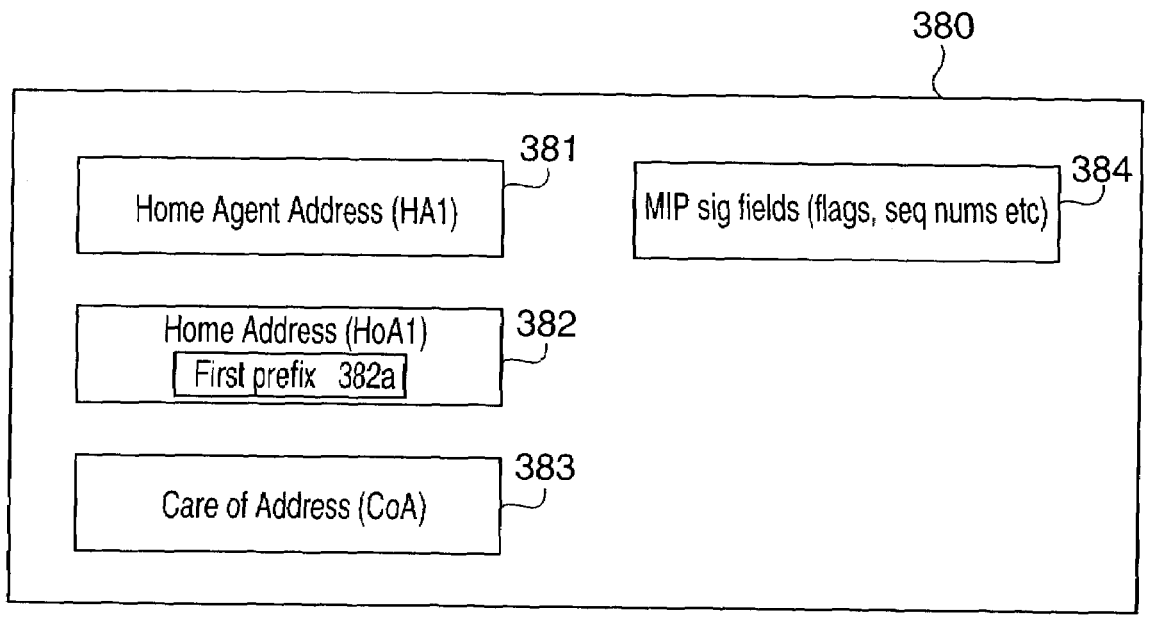
FIG. 3 shows the details of a prior art registration message used to manage the binding for a single home address.
Figure 4:
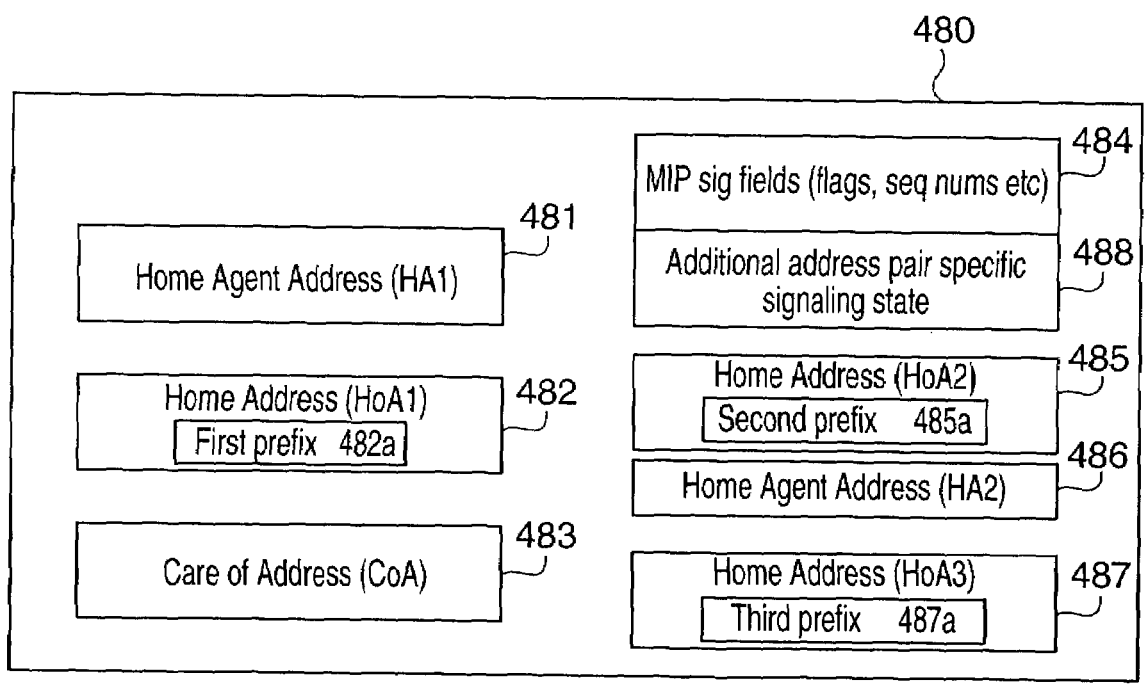
FIG. 4 shows registration message details of an exemplary aggregated message of the invention used to manage the bindings for three home addresses at the same time.
Figure 5:
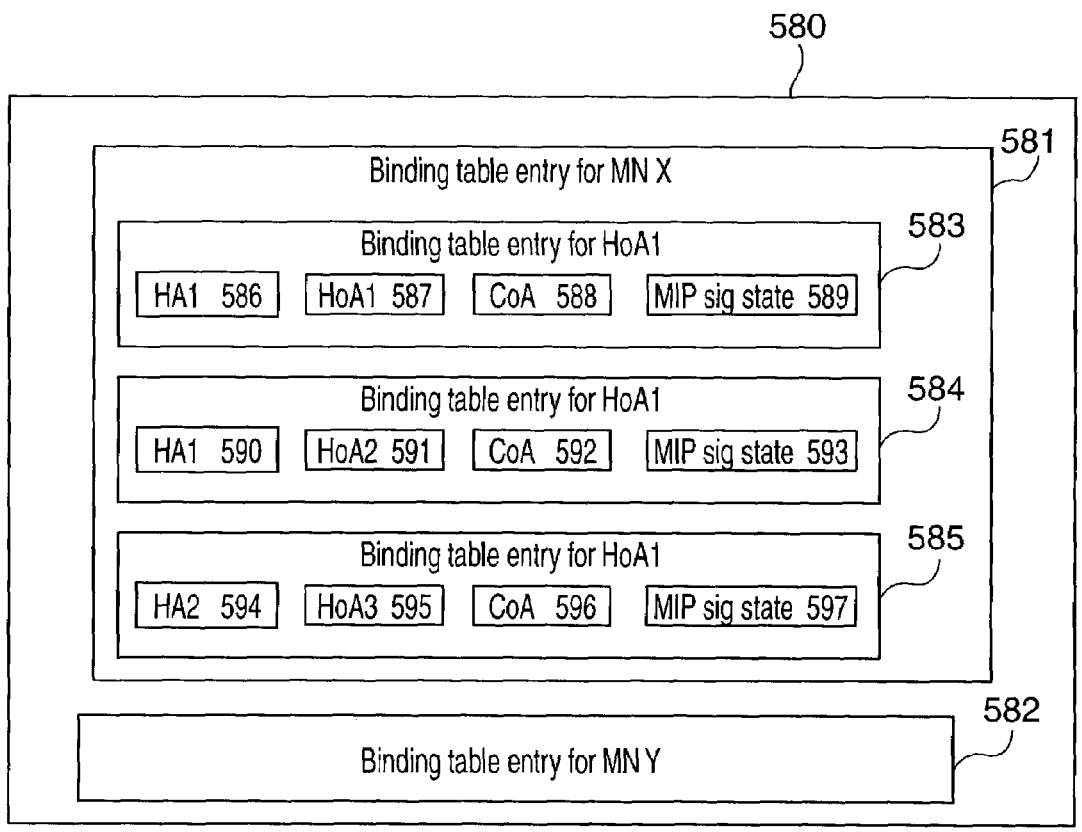
FIG. 5 shows the contents of a prior art binding table in a mobility agent, such as a foreign or home agent, for managing three home addresses.
Figure 9:
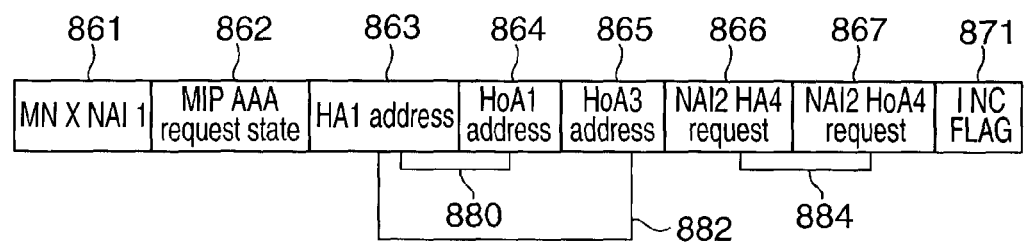
FIG. 9 illustrates an exemplary aggregated message which can be used as an aggregated authentication, authorization and/or accounting request message in accordance with the invention.
Figure 11:
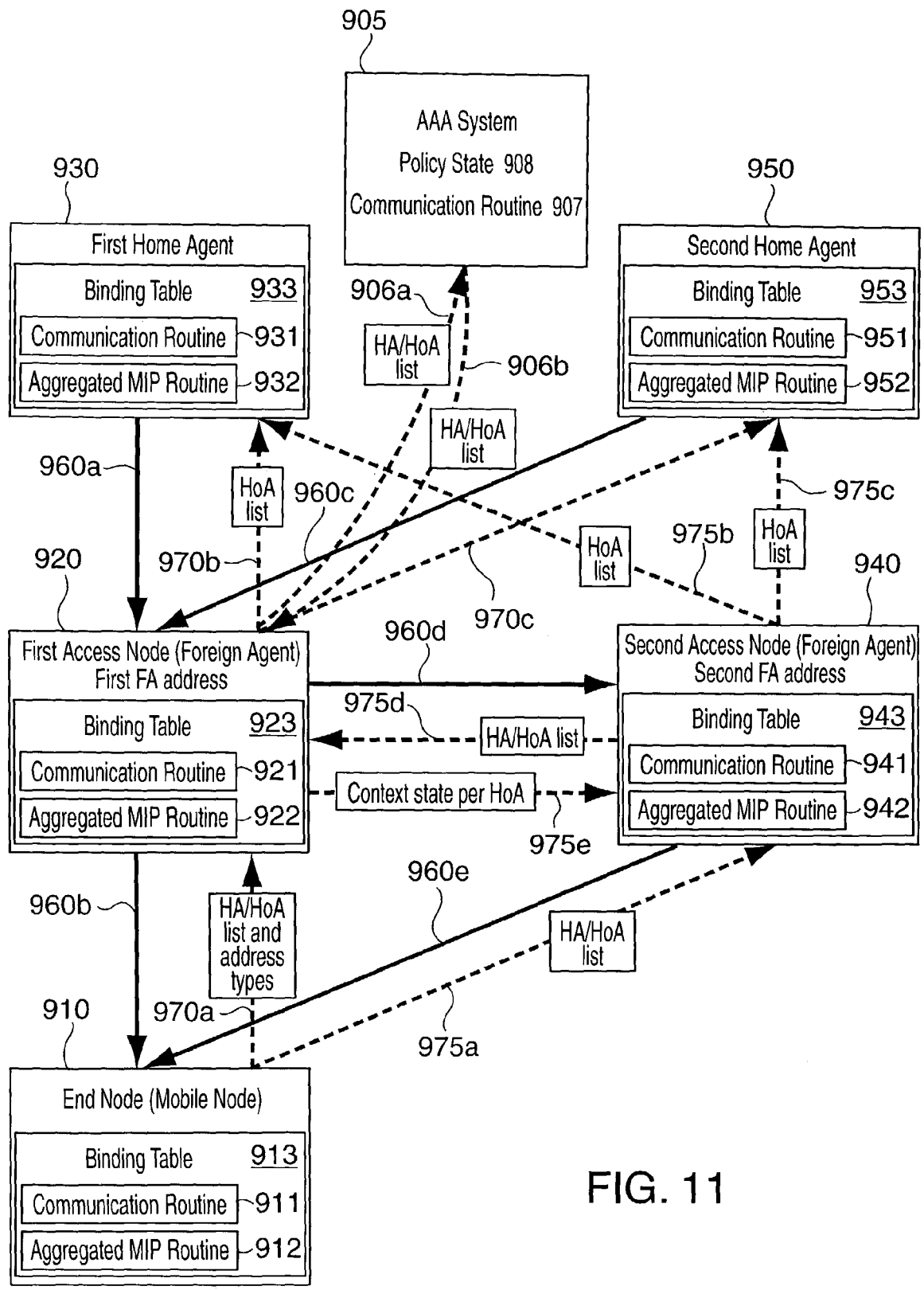
FIG. 11 shows an exemplary communications system for using the invention for registering and handing off multiple home addresses with a single MIP signaling instance.

FIG. 2 shows the passing of aggregated messages between first and second nodes 240, 250 in accordance with the invention. Node 240 includes memory 241 which is part of an interface used to buffer incoming and outgoing messages and data. Similarly, node 250 includes memory 242 which is part of an interface which buffers messages received by or transmitted from node 250. FIG. 4 illustrates an exemplary message which may be communicated between nodes 240, 250 while FIGS. 9 and 11 illustrate various exemplary nodes which may be used as the first and second nodes 240, 250. The first node 240 may be an end node, such as end node 910, or an access node such as access node 930 of FIG. 11. The second node 240 may be, e.g., a home agent 930 or an access node such as access node 920. The registration signaling corresponds to an aggregated MIP signaling instance, e.g., registration message and corresponding reply message, in accordance with the present invention that is used to efficiently manage multiple bindings for a first end node 240. A single aggregated MIP registration request or binding update message 280 is sent from a first node 240 (similar to first node 140 of FIG. 1) to a second node 250 (similar to second node 150 of FIG. 1), carrying sufficient information to install multiple bindings in the second node 250 for multiple home addresses associated potentially with multiple home agents, which map to the same CoA of the end node. An aggregated MIP Registration Response or Binding Update Acknowledgement message 281 then reports the result of the binding installation for each of the home addresses of the end node back to the first node 240. The use of a single signaling instance to update registration information corresponding to multiple HoAs, made possible by the use of aggregated messages, enables the amount of signaling bandwidth and signaling state to be reduced as compared to using conventional MIP messages. Three bidirectional IP packets flows, represented as dashed line 282, are routed based on information included in the aggregated signals 280, 281 which are used to install bindings into the second node 250 for the three home addresses HoA1, HoA2 and HoA3 of the first end node 240.

FIG. 4 shows detailed contents 480 of an exemplary aggregated registration message, such as, for example, message 280 or 281 of FIG. 2, in accordance with the present invention. Aggregated message contents 480 includes a home agent address (HA1) 481 which identifies a node 930 (see FIG. 11), a home address 1 (HoA1) 482 with a first prefix 482$a$ assigned to the identified node 930, a CoA 483 associated with the second address 482 and MIP signaling fields 484. In addition, the message contents 480 includes a second home address (HoA2) 485 with a second prefix 485$a$, said second prefix 485$a$ being different from said first prefix 482 and being from the first home agent identified by address 481. Alternatively or additionally, the message contents 480 includes a third home address (HoA3) 487 with a third prefix 487*a* where said third prefix 487*a* is from the second home agent address (HoA2) 486. The aggregated message may include any number N of HoAs where N is equal to at least 2. The contents 480 of the message are arranged so that the receiving node can uniquely determine the pair comprising the Home agent address and the home address at that home agent that is mapped to the common CoA 483. Therefore, the aggregated message 480 can describe multiple home addresses from a single home agent, multiple home addresses from different home agents as well as additional combinations of home and home agent addresses. In an exemplary embodiment, the aggregate message would use the pair HA1 481+HoA1 482 as the master binding, whilst a MIP extension is used to describe an INCLUDE/EXCLUDE list of additional HoAs at the master HA, followed by a additional HA+HoA pairs not at the master HA. The include/exclude list structure indicates that the included address pairs should be included or excluded (as indicated by flags) from the binding table entries associated with this end node CoA as indicated by the include/exclude list. The include/exclude structure provides additional aggregation advantages as compared to a message without such a list especially as the number of address pairs grows large. The MIP signaling fields 484 in the aggregated message maybe unchanged from that of the prior art message only when all address pairs use the same signaling fields. When address pairs have different forwarding requirements then additional address pair specific signaling state 488 is appended to the signaling state for the individual address pairs. Thus, different signaling state 488 may be included for the first address pair HA1/HoA1, second address pair HA1/HoA2 and third address pair HA2/HoA3. MIP flags which are the same for all pairs included in the message 480 may occur only once in the message, e.g., as part of the set of common MIP signaling fields 484.

Figure 6:
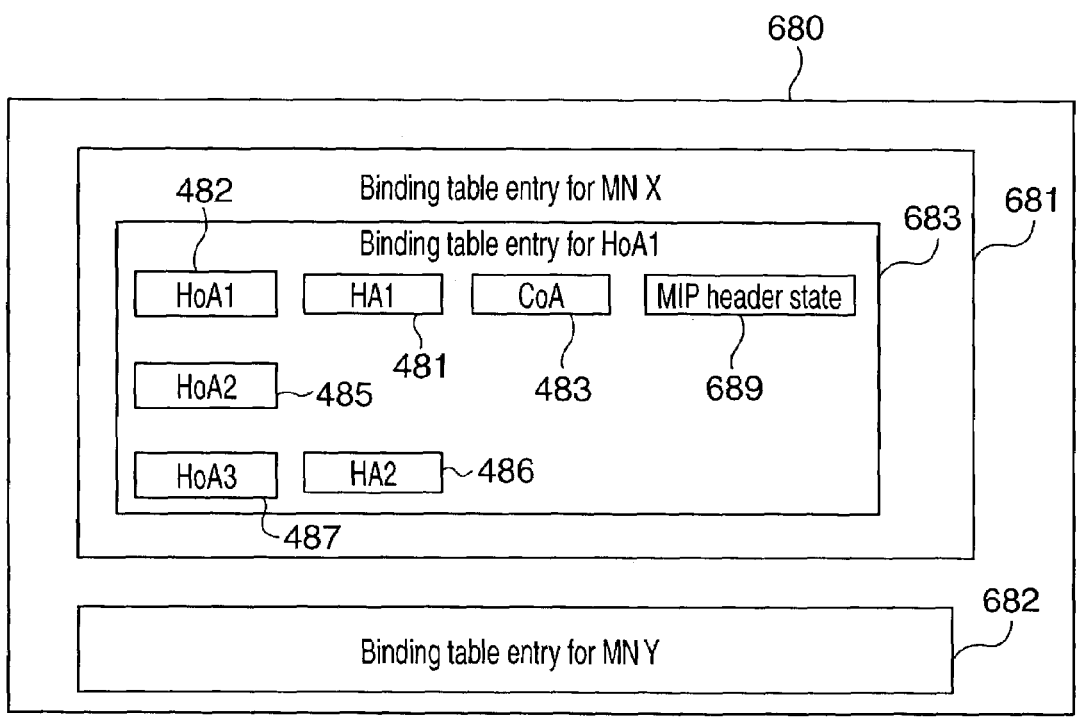
FIG. 6 shows the contents of an aggregated binding table entry of the invention for managing three home addresses.
Figure 7:
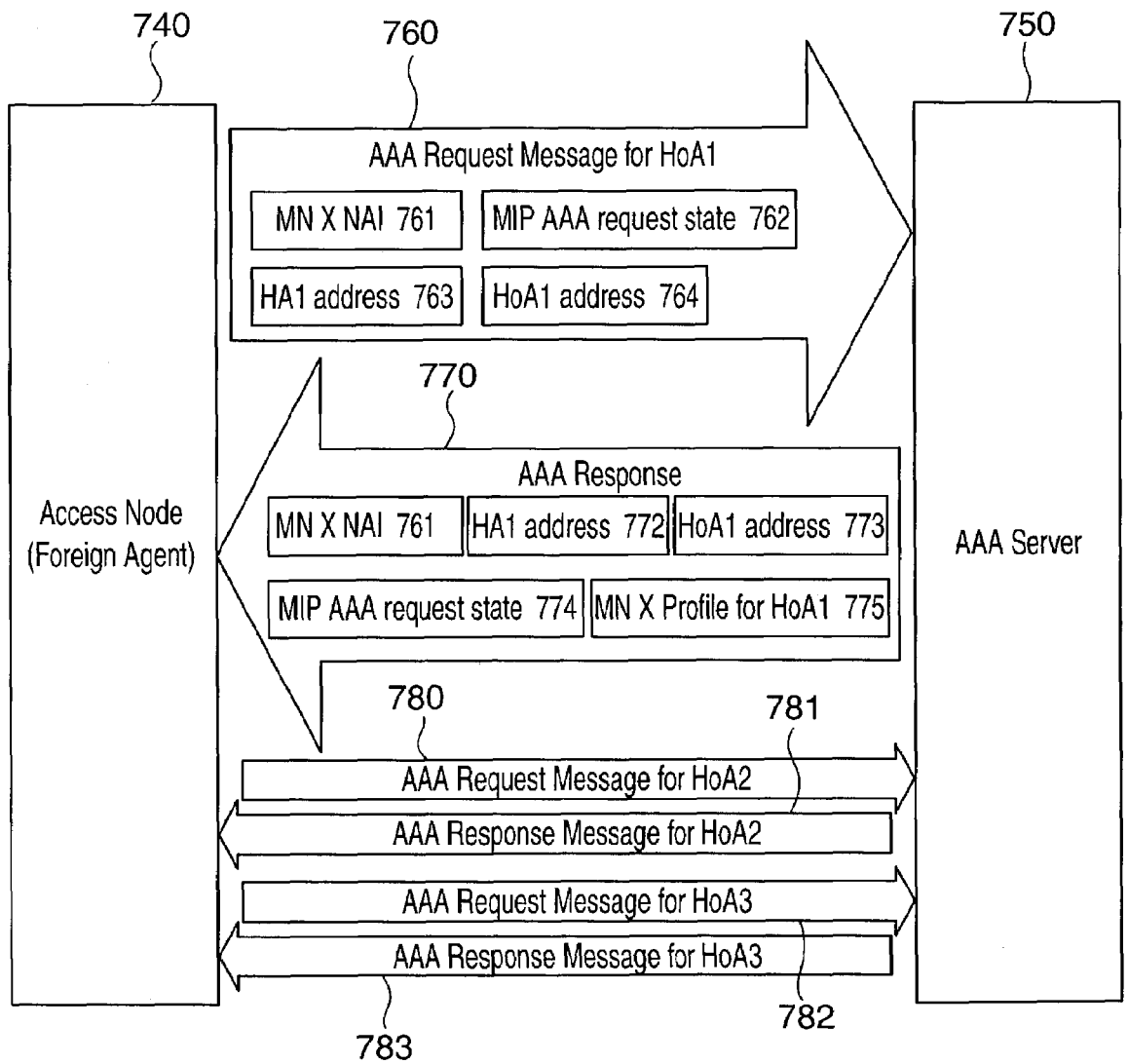
FIG. 7 shows three prior art AAA signaling instances between an access node and a AAA server for obtaining the end node profiles associated with three home addresses.

In response to receiving an aggregated binding message, e.g., message 250, the receiving node will update its binding table entries, e.g., a single aggregated binding table entry will be updated in response to receiving an aggregated update message 250. As shown in FIG. 6, the single binding table entry may include multiple HAs and HoAs. As part of the receiving and updating process, the aggregated message 250 may and often is, temporarily stored in memory included in the receiving node.

FIG. 6 shows an aggregated binding table structure 680 in accordance with the present invention, showing entries 681 and 682 for MN X and MN Y. MN X has three home addresses HoA1 482 from HA 1 481, HoA2 486 also from HA1 481 and HoA3 487 from HA2 486. A binding table of the type illustrated in FIG. 6 may be used in each of the nodes 920, 930, 950-shown in FIG. 9 and may be implemented in memory included in the node 920, 930, 950 in which the table is located. These three address pairs share the same CoA 483 and MIP signal state 689 entries as a single aggregated message used to manage these bindings, in accordance with the invention, using the address pair HoA1 at HA1 as the master binding. Note that HoA2 485 is listed below HoA1 482 and has no HA field defined because it inherits the value from the master binding shown in the first row of entry 683. In alternative embodiments, the binding table can be split so that the address pairs can be searched in the binding table and the CoA and MIP sig state (which is in a separate table) is indexed by a pointer associated with the matching address pair. Where differences exist between the MIP sig state for each address pair, these can be further indexed out of the binding table by an additional index to a third table. Essentially though, all embodiments, in accordance with the present invention, share the property of removing redundant information and facilitating the use of aggregated signaling messages.

Figure 8:
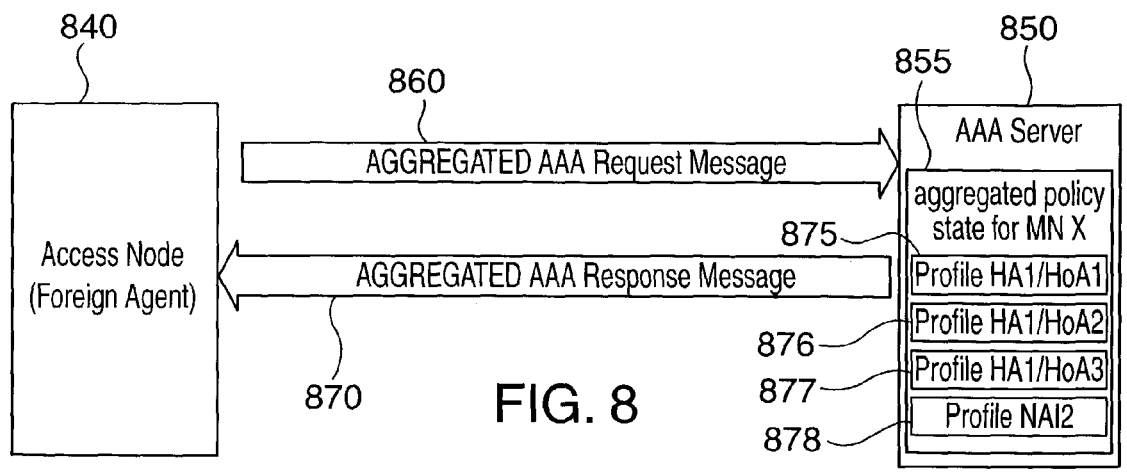
FIG. 8 shows a single aggregated AAA signaling instance of the invention used to obtain three end node profiles at the same time.

FIG. 8 extends the aggregated signaling and storage concept of the present invention to a AAA Request message 860 and a AAA Response message 870 which are passed between an access node 840 and AAA server 850, with AAA server 850 including aggregated policy state 855 for the HoAs corresponding to the MN X Network Access Identifier (NAI) 1. The aggregated policy state includes Profile 875 for a statically allocated HA1/HoA1 address pair for the MN X. Profile 876 is for a second statically allocated HoA2 at the same HA1 as profile 875. Profile 877 is for a dynamically allocated HoA3 address as a statically allocated HA3 address, the AAA server is responsible for the address allocation in this example but this is for purposes of the example and is not intended to indicate a loss of generality. The profile 878 is associated with an NAI 2 (Network Access Identifier 2) that is different from the MN X NAI 1 associated with profiles 875, 876, 877. Profile 878 is for a dynamically allocated HA and HoA from the domain identified in that NAI 2. Messages 860, 870 are stored, at least temporarily in memory included in each of the receiving and transmitting nodes, e.g., as part of the transmitting and receiving process.

Figure 12:
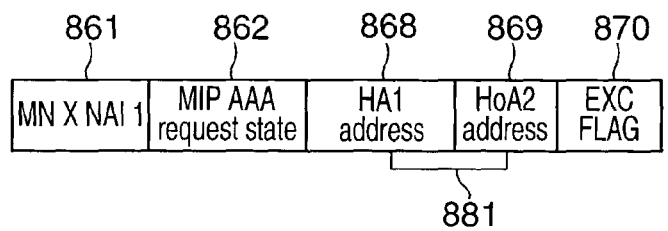
FIG. 12 illustrates an alternative exemplary aggregated message which can be used as an aggregated authentication, authorization and accounting message in accordance with the invention.

FIG. 9 is a detailed example of an exemplary request message, an AAA message 860, which can be used as an authentication, authorization and/or accounting message. The message 860 comprises a MN identifier 861, a state request field 862, a first aggregated HA/HoA address grouping 869 including HA1 863 and statically allocated HoA1 864, and a dynamically allocated address HoA3 865 whose value is not known at the time of the sending of the request message 860. Both HoA1 and HoA3 correspond to the first HA address HA1 863. Therefore elements 863, 864, 865 represent two HA, HoA pairs 880, 882. The message 860 further includes a request for a third HA/HoA address pair 884, which includes HA4 866 and HoA4 867, associated with an NAI 2 which is associated with MN X, said NAI 2 is different from said NAI 1. Note that normally neither HA4 nor HoA4 are known in advance of sending the aggregated request message 860 as they will be dynamically allocated, said dynamic allocation being guided or controlled by the NAI 2 HA4 and HoA4 requests 866, 867, and the associated profile state 878. HA/HoA address pairs and request form the first part of what can be called an included/exclude list. An include flag 871 is used to indicate that the profiles in the AAA server associated with address pairs 880, 882 and 884 should be returned to the access node 840, these profiles being profiles 875, 877 and 878. The fact that the address pair HA1/HoA2 associated with profile 876 is missing from a request with the include flag set indicates that the access node 840 does not need the profile 876 to be returned for the MN X. A particular exemplary request message is shown in FIG. 12 where the exemplary aggregated request message 860 again includes the MN X NAI 1 identity 861 and MIP AAA request state 862. This is followed by an address pair 881 comprising HA1 address 868 and HoA2 address 869 associated with MN X NAI 1 861 and profile 876. The exclude flag 870 is then added to the message. This informs the AAA server 850 that the AAA request is for all profiles and associated allocations that are associated with MN X that are not mentioned in the AAA request message, these being the same profiles described in FIG. 9. An include flag is therefore generally preferable in a request message when the number of included entries is less than the number of excluded entries. Note however that the dynamic allocation of HoA3, HA4 and HoA4 cannot now be guided by parameters in the missing request messages 865, 866 and 867 of FIG. 12 compared to FIG. 9, and must instead be fully guided by the Profile state 877 and 878. Therefore, a composite of include and exclude entries may be combined in a single message to provide control for dynamic allocation requests with maximum message efficiency. The include flag 871 and/or exclude flag 870 may be implemented as part of a MIP extension that also implements the list of HA/HoA address pairs, or could be an MIP header flag, or a specific AAA Attribute Value Pair (AVP) for example.

Figure 10:
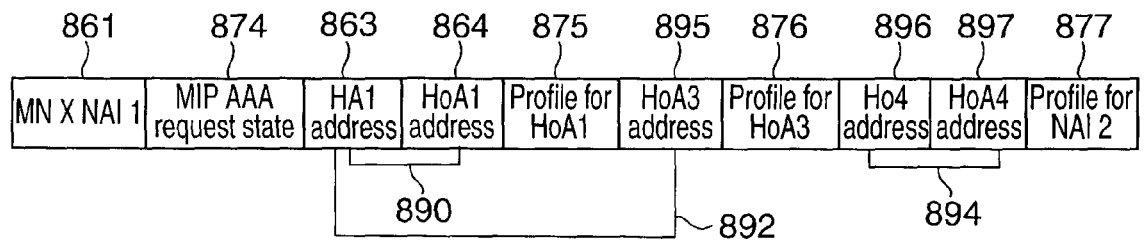
FIG. 10 illustrates and exemplary aggregated reply message which may be returned in response to the messages of FIG. 9 or FIG. 12.

Contents of an exemplary AAA response message 870 are shown in FIG. 10 when using either the request message of FIG. 9 or FIG. 12. The MN X NAI 1 861 and MIP AAA response state 874 are returned to the access Node 840 along with address pairs 890, 892 and 894. Address pair 890 includes HA1 address 863 and HoA1 address 864 along with the associated profile 875. Address pair 892 includes HA1 address 863 and dynamically allocated HoA3 address 895, and is followed by the associated profile 876. Address pair 894 comprises dynamically allocated HA4 address 896 and HoA4 address 897 followed by the associated profile 877, addresses 896, 897 being allocated from the domain identified by MN X NAI 2.

In addition to providing message savings, any process at the AAA server, such as MN authentication, that may typically comprise multiple steps of messaging and processing that are not shown in FIG. 8, that is normally conducted for each AAA request message, may, and often is, conducted once for the aggregated message, providing additional benefits of the invention.

During a hand-off the MN X profile and associated configuration state is handed-off between access nodes. This can be performed using AAA in accordance with the invention. Therefore, an aggregated MIP hand-off message for multiple HoAs of a MN X can trigger an aggregated message to transfer the MN X profile for each HoA to the new access node, from the old access node, the old access node effectively becoming the AAA server 850 of FIG. 8.

The invention is summarized in an exemplary communications system of FIG. 11 for the case of an end node 910 which for example is a Mobile Node (MN 910), coupled to a first and a second access node 920, 940, respectively, which for example contain MIP v4 Foreign Agents or MIPv6 Attendents. Access Nodes 920, 940 may alternately be referred to as Foreign Agents (FAs) 920, 940, respectively, since they include FA modules which allow them to operate as FAs. FAs 920, 940 are both coupled to first and second MIP Home Agents or Regional Agents 930, 950 (HAs 930, 950). The FA 920 also has a coupling with an Authorization and Authentication system 905 which enables the FA 920 to authenticate the MN 910 and to obtain an Authorization Profile called the MN Profile which is installed into the FA 920 and used to policy the communications activity of the MN 910. All nodes 905, 910, 920, 930, 940, 950 have a communications routine 907, 911, 921, 931, 941, 951, respectively, used to send MIP and policy signaling for initial registration and for hand-off of the MN 910 between FAs 920, 940, as well as to forward packets between nodes. The nodes 910, 920, 930, 940, 950 have an Aggregated MIP Routine 912, 922, 932, 942, 952, respectively, which enable a single MIP signal, e.g., aggregated message, to affect binding state for more that one HoA at a single HA at a time. In addition, nodes 910, 920, 940 have an extended routines 912, 922, 942, respectively, which also enable them to use a single MIP message to affect state associated with multiple HAs. Routines 912, 922, 932, 942 and 952 support and implement aggregation of MIP signaling such that a single MIP message can be used to manipulate various, e.g., all, MIP state for a MN 910, thereby eliminating the need for a multitude of MIP messages in order to manipulate the state, e.g., one message for each single HA/HoA pair as is normally done with conventional MIP signals. This enables a binding table 933, 953, 923, 943, 913 and other MIP state in the HA 930, HA 950, FA 920, FA 940, MN 910, respectively to store state as if a separate MIP signaling phase was being used for each distinct HoA thereby allowing an aggregated message to be used with a conventional type of binding table. In an alternative embodiment, aggregated binding table state such as the binding table 680 of FIG. 6 of the invention can be employed where a single instance of MIP signaling state associated with a single MN 910 (including MIP flags, security, lifetime, sequences numbers, challenges, tunnel types and other extensions) can be generated for a main Home Agent, Home Address and CoA triplet. Routines 922, 942 further manage the fan-out, e.g., de-aggregation, of MIP registration signaling to multiple HAs and the fan-in, e.g., aggregation, from the multiple associated MIP Replies.

When MN 910 connects to the first FA 920 it sends an aggregated MIP Registration Request (MIPv4) or Binding Update (MIPv6) message 970a to the FA 920 including its identity such as at least one Network Access Identifier. The FA 920 then sends a message 906a, such as a RADIUS access_request to the AAA system 905 to authenticate the MN 910 and fetch the Policy state 908 for mobility management of Home addresses HoA1, HoA2 and HoA3 at the first and second HAs 930, 950. The HoAs and HAs may be predefined or dynamically allocated but an essential inventive step is to enable a multitude of Policy state to be returned to the FA 920 in the Access_Accept message 906b, triggered by a single MIP registration message 970a. If the multiple HoAs are to be allocated by the HA 930, 950 then they will not be in the returned policy state although the policy state for each yet to allocated address may be. The message 970a can include a HA/HoA list extension and associated address type information which can be used by the FA 920 to indicate to the AAA system which subset of all available policy state is needed for this MN 910 at this time. The HA/HoA list can either name each HA domain and the address types in each domain, or it can actually include specific statically allocated HA and HoA identifiers. The named elements can be designated as an indication of which policy should, or should not be returned the FA 920, hence operating as either an INCLUDE or EXCLUDE list. The policy state also should include MIP security associations for securing communications between the FA 920 and the HAs 930, 950, between the MN 910 and the FAs 920, 940, and between the FAs 920, 940 themselves.

The policy state is stored in the FA 920 as part of the context state for the MN 910 and will normally include at least the address of each HA 930, 950 and a place holder for the requested address types from that HA. Such address types can be IPv4 public addresses, IPv4 private addresses, various IPv6 address types (link, site and global scope, with and without EUI64s) as well as addresses from specific address prefixes (address ranges) that correspond to different commercial entities. Providing multiple addresses from a common address prefix to a MN 910 is useful if that MN 910 is acting as a Mobile Router and can onward allocate those addresses. Allocating multiple home addresses to a MN 910 from different address prefixes at a HA, e.g., addresses which are not from a contiguous block of addresses, is useful because each address can be owned by different commercial operators with connectivity to that HA, such that each address provides different communications capabilities with associated policy constraints to the MN 910. For example, the same HA can allocate an address from the public ISP of the MN 910 as well as an address from the corporate network of the MN 910.

Message 970a for triple HA1 HoA1 CoA, including HA/HoA list extension for, HA1 HoA2 and HA2 HoA3, is converted by routine 922 into a partially aggregated message 970b including HoA list extension with HoA2 directed to the first HA1 930. The fan-out (deaggregation) process in the FA 920 also sends, in response to receiving an aggregated message 970, a deaggregated message 970c to the second HA 950 for HA2 HoA3 CoA. These messages are used to obtain any dynamically allocated HoAs from those HAs which are returned to the FA 920 and the MN 910 in the MIP reply messages. Note that the FA 920 aggregates reply codes and other information from reply messages received in separate reply messages from the two HAs for each of the HoAs 1, 2, 3 to enable a single aggregated Reply message to be returned by the FA 920 to the MN 910. These replies can also include per HA/HoA success failure information which is returned to the MN 910 intact so that it is fully aware of its evolving connectivity and can then attempt to repair any defects with aggregated or unaggregated signals. T he completion of the MIP registration/binding update signaling results in a single aggregated binding table entry, e.g., aggregated binding table entry 683, being installed in the FA 920 and the HA 930 for the HoA 1 and HoA2 which is mapped to the MN 910 and the Care of Address of the MN 910. Packet flow 960a from HA 930 to FA 920 then includes packets from peer nodes destined for either the HoA 1 or HoA 2 of the MN 910, packet flow 960c from HA 950 to FA 920 then includes packets from peer nodes destined to the HoA3 of the MN 910, addresses HoA1, 2,3 being assigned to interfaces on the MN 910. If the End Node CoA is assigned to another interface on the MN 910 then it is a Colocated CoA (CCoA) and packets from the peer nodes will be directed from HAs 930, 950 to the CCoA using redirection mechanisms such as tunneling or routing headers. If the end node CoA is the FA CoA of FA 920, then the HAs 930, 950 instead redirect packets to the FA CoA which then forwards them to the MN 910 using the binding information in table 680. Therefore packet flow 960b from FA 920 to MN 910 includes packets from both packet flows 960a and 960c.

As is well known in MIP, the bindings in the HA 930, 950 and FA 920 should be refreshed in advance of the binding lifetime expiring. Accordingly, to achieve a high level of aggregation the lifetimes and the CoAs for the bindings for the MN 910 should all be the same. MIP also includes a number of other parameters such as tunnel types, challenge and security mechanisms. The more the parameters are common for each of the HoAs at each of the HAs, then the greater is the aggregation benefit of the invention. Without loss of generality, this invention enables any MIP parameters to be common between the HoAs and the HAs other than of the course both the HA and HoA addresses themselves. If the MN 910 wishes to add or drop a specific HoA/HA from the aggregate, then the INCLUDE/EXCLUDE list extension (e.g., include or exclude flag) is used to communicate the change to the FA 920 and HAs 930, 950 so that the associated policy and MIP state can be amended.

Further aggregation benefits accrue during hand-off when the MN 910 moves to a new FA 940. The case for a reactive hand-off, whereby MIP signaling is sent via the new FA 940 will be described and is shown in FIG. 9, but an aggregated proactive hand-off whereby the MIP signaling is sent via the old FA 920 and triggers an MIP signal from the old FA 920 to the new FA 940 is also possible, in accordance with the present invention. The reactive hand-off requires the MN 910 to send an aggregated MIP registration request or Binding Update message 975a to the new FA 940, including the HA/HoA list to indicate which packets to redirect to the new FA 940 and which to deprecate. The HA/HoA routine 942 will then issue an aggregated Binding Update (BU) message 975d to the old FA 920 to update the binding information in the binding table 923 in the old FA 920 with the CoA from the prefix of the new FA 940. This newCoA again may be a FA CoA or a CCoA but the modifications will only be applied to the bindings as indicated by the HA/HoA list in the BU 975d. Packets destined for the oldCoA in affected bindings are then redirected to newCoA by the FA 920 to create packet flow 960d from old Fa 920 to new FA 940 which is onward forwarded to the MN 910 as packet flow 960e. Unaffected bindings will continue to forward packets to the MN 910 as flow 960b which will terminate when the HAs 930, 950 stop directing packets towards the oldCoA or when the MN 910 decouples from the FA 920. The BU message 975d triggers a message 975e from the FA 920 to the FA 940 which transfers the policy state for the HoAs indicated by message 975d to enable policy state and MIP configuration, including security state to be transferred to the new FA 940. Undertaking the hand-off in parallel for all HoAs avoids the cost of multiple independent MIP hand-off signals which comsumes excessive bandwidth and which independently could fail or become desynchronized leading to significant complexity. Message 975a also triggers messages 975b and 975c to HA 930, 950, respectively, which are aggregated MIP signals for multiple HoAs at the same HA. These update the bindings 933, 953 in the HAs to replace the oldCoA with the newCoA. Packets are then no longer directed towards the MN 910 via FA 920 and instead go via FA 940.

In summary, significant aggregation benefits can be obtained when a MN has multiple HoAs from a single HA, if the MN has a single HoA from multiple HAs, and as described in FIG. 9, multiple HoAs from multiple HAs which is the general case. The single MIP signaling phase from MN 910 back to MN 910 via FA and HA can be MIP v4 or MIPv6 based, but can reference a multitude of address types associated with HoAs and HAs. Note that a shared CCoA can be used for any combination of IPv4 and IPv6 addresses whilst a CoA can only be used for IPv4 addresses of different types.

The aggregated hand-off signaling can be used after non-aggregated signaling is initially used to install bindings for each HoA into each HA, FA. During this initial deaggregated phase, the MN 910 can attempt to negotiate maximally uniform parameters across the MIP state for each HoA so that maximum aggregation benefit is obtained during hand-off.

The provisional applications incorporated by reference into the present application include various exemplary embodiments which are not intended to limit the scope of the present application. Any mandatory language such as must, only, necessary, etc, found in the provisional applications is intended to be interpreted as applying to the exemplary embodiments described in the provisional applications and not to limiting the invention, claims or embodiments described in the present application in any way.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed:

1. An end node associated with a home agent and configured for communication, the end node comprising:
   circuitry operable to execute:
   an aggregated MIP routine to generate an aggregated binding message to affect a binding state at a foreign agent linked to the home agent of at least two HoA/HA pairs and a common address mapped to each of the at least two HoA/HA pairs at a same time; and
   a communication routine to transmit the aggregated binding message to the foreign agent upon initial registration with the foreign agent.

2. An end node associated with a first home agent, and a second home agent and configured for communication, the end node comprising:
   circuitry operable to execute:
   an aggregated MIP routine to generate an aggregated binding message to affect a binding state at a foreign agent of a first and second HoA/HA pairs and a common address mapped to each of the first and second HoA/HA pairs at a same time, wherein the foreign agent is linked to the first and second home agent and wherein the first HoA/HA pair is associated with the first home agent, and the second HoA/HA pair is associated with the second home agent; and
   a communication routine to transmit the aggregated binding message to the foreign agent upon initial registration with the foreign agent.

3. An end node associated with a first home agent and a second home agent and configured for communication, the end node comprising:
   circuitry operable to execute:
   an aggregated MIP routine to generate an aggregated binding message to affect a binding state at a foreign agent of at least first, second and third HoA/HA pairs and a common address mapped to each of the at least first, second and third HoA/HA pairs at a same time, wherein the foreign agent is linked to the first and second home agents and wherein the first and second HoA/HA pairs are associated with the first home agent and the third HoA/HA pair is associated with the second home agent; and
   a communication routine to transmit the aggregated binding message to the foreign agent upon initial registration with the foreign agent.

4. An end node associated with a home agent and configured to hand off communication from an old foreign agent to a new foreign agent, the end node comprising:
   circuitry operable to execute:
   an aggregated MIP routine to generate an aggregated binding message to affect a binding state at the new foreign agent of at least two HoA/HA pairs and a common address mapped to each of the at least two HoA/HA pairs at a same time; and
   a communication routine to transmit the aggregated binding message to the new foreign agent upon handoff from the old foreign agent to the new foreign agent.

5. An end node associated with a first home agent and a second home agent and configured to hand off communication from an old foreign agent to a new foreign agent the end node comprising: circuitry operable to execute:
   an aggregated MIP routine to generate an aggregated binding message to affect a binding state at the new foreign agent of at least two HoA/HA pairs and a common address mapped to each of the at least two HoA/HA pairs at a same time, wherein a first of the at least two HoA/HA pairs is associated with the first home agent and a second of the at least two HoA/HA pairs is associated with the second home agent; and
   a communication routine to transmit the aggregated binding message to the new foreign agent upon handoff from the old foreign agent to the new foreign agent.

6. An end node associated with at least one home agent and configured to hand off communication the end node comprising:
   circuitry operable to execute:
   an aggregated MIP routine to generate an aggregated binding message to affect a binding state of at least two HoA/HA pairs and a common address at a same time, wherein the common address is mapped to each of the at least two HoA/HA pairs via a binding maintained by the end node; and
   a communication routine to transmit the aggregated binding message to the at least one home agents serving the handed off region upon handoff from the foreign agent.

7. An access node configured for hand off communication with an end node the access node comprising:
   a binding table; and
   means, responsive to an aggregated binding message from the end node, for updating entries in the binding table to affect a binding state associated with at least two HoA/HA pairs and a common address mapped to each of the at least two HoA/HA pairs at a same time, wherein the at least two HoA/HA pairs is associated with at least one home agent.

8. The access node of claim 7, further comprising means for generating an aggregated binding update message to an old access node serving a previous visited region to affect a binding state at a same time of information in a binding table of the old access node including updating the common address with a new common address for mapping to the each of the at least two HoA/HA pairs associated with the access node.

9. The access node of claim 8, further comprising:
means for receiving a message including at least one of policy state and MIP configuration information from the old access node in response to the aggregated binding message; and
means for updating the binding table of the access node with the at least one policy state and MIP configuration information.

10. The access node of claim 7, wherein the common address is a co-located care of address.

11. The access node of claim 7, wherein the HoA addresses in each of the at least two HoA/HA pairs include at least one IPv4 and one IPv6 addresses served by a same one of the at least one home agent.

12. The access node of claim 11, wherein the common address is a ca-located care of address associated with the at least one IPv4 and one IPv6 addresses.

13. The access node of claim 7, wherein the access node is a mobile router.

14. An access node configured for hand off communication with an end node the access node comprising:
a binding table; and
means for updating a binding state in the binding table, in response to an aggregated binding update message from a new access node with a new common address mapped to each of at least two HoA/HA pairs and with binding information for the at least two HoA/HA pairs associated with at least one home agent and associated with the new access node, wherein the updating occurring at a same time for all the at least two HoA/HA pairs.

15. The access node of claim 14, further comprising:
means for communicating at least one of policy state and MIP configuration information from the binding table to the new access node in response to the aggregated binding update message.

16. The access node of claim 14, wherein the new common address is a co-located care of address.

17. The access node of claim 14, wherein the HoA addresses in each of the at least two HoA/HA pairs include at least one IPv4,and one IPv6 addresses served by a same one of the at least one home agent.

18. The access node of claim 17, wherein the new common address is a co-located care of address associated with the at least one IPv4 and one IPv6 addresses.

19. The access node of claim 14, wherein the new access node is a mobile router.

20. An access node configured for hand off communication comprising:
an aggregated binding table associated with each visiting end node and with visited end nodes for which a lifetime entry value has not expired,
each aggregated entry in the aggregated binding table comprised of plural HoA/HA pairs associated with at least one home agent and at least one of a care of address or a co-located care of address common to all the plural HoA/HA pairs,
the access node further comprising updating, in response to an update of a HoA/HA pair, a binding state of all other HoA/HA pairs in aggregate fashion, except for excluded ones of the plural HoA/HA pairs.

21. A AAA server configured for communication with access nodes, the AAA server comprising:
means for updating aggregated policy state for an end node served by a requesting access node in response to an aggregated message received from the requesting access node, the aggregated message including an end node identifier identifying the end node; and
means for generating an aggregated response message, including the end node identifier, an end node AAA response state, and an address pair information a common address mapped to each of the for at least two HoA/HA pairs along with associated profiles to the requesting access node during a hand off on the basis of the aggregated message.

22. An access node comprising:
an aggregated binding table associated with each mobile node hosted by a home agent, wherein each aggregated entry in the aggregated binding table comprised of plural HoA/HA pairs associated with at least one home agent and at least one of a care of address or a co-located care of address common to all the plural HoA/HA pairs;
a binding state of all other HoA/HA pairs in aggregate fashion, except for excluded ones of the plural HoA/HA pairs.

23. An end node associated with a home agent and configured for communication, the end node comprising:
means for generating an aggregated binding message to affect a binding state at a foreign agent linked to the home agent of at least two HoA/HA pairs and a common address mapped to each of the at least two HoA/HA pairs at a same time; and
means for transmitting the aggregated binding message to the foreign agent upon initial registration with the foreign agent.

24. An end node associated with a first home agent and a second home agent and configured for communication, the end node comprising:
means for generating an aggregated binding message to affect a binding state at a foreign agent of a first and second HoA/HA pairs and a common address mapped to each of the first and second HoA/HA pairs at a same time, wherein the foreign agent is linked to the first and second home agent and wherein the first HoA/HA pair is associated with the first home agent, and the second HoA/HA pair is associated with the second home agent; and
means for transmitting the aggregated binding message to the foreign agent upon initial registration with the foreign agent.

25. An end node associated with a first home agent and a second home agent and configured for communication, the end node comprising:
means for generating an aggregated binding message to affect a binding state at a foreign agent of at least first, second and third HoA/HA pairs and a common address mapped to each of the at least first, second and third HoA/HA pairs at a same time, wherein the foreign agent is linked to the first and second home agents and wherein the first and second HoA/HA pairs are associated with the first home agent and the third HoA/HA pair is associated with the second home agent; and
means for transmitting the aggregated binding message to the foreign agent upon initial registration with the foreign agent.

26. An end node associated with a home agent and configured to hand off communication from an old foreign agent to a new foreign agent, the end node comprising:
means for generating an aggregated binding message to affect a binding state at the new foreign agent of at least two HoA/HA pairs and a common address mapped to each of the at least two HoA/HA pairs at a same time; and means for transmitting the aggregated binding message to the new foreign agent upon handoff from the old foreign agent to the new foreign agent.

27. An end node associated with a first home agent and a second home agent and configured to hand off communication from an old foreign agent to a new foreign agent, the end node comprising:
   means for generating an aggregated binding message to affect a binding state at the new foreign agent of at least two HoA/HA pairs and a common address mapped to each of the at least two HoA/HA pairs at a same time, wherein a first of the at least two HoA/HA pairs is associated with the first home agent and a second of the at least two HoA/HA pairs is associated with the second home agent; and
   means for transmitting the aggregated binding message to the new foreign agent upon handoff from the old foreign agent to the new foreign agent.

28. An end node associated with at least one home agent and configured to hand off communication, the end node comprising:
   means for generating an aggregated binding message to affect a binding state of at least two HoA/HA pairs and a common address at a same time, wherein the common address is mapped to each of the at least two HoA/HA pairs via a binding maintained by the end node; and
   means for transmitting the aggregated binding message to the at least one home agents serving the handed off region upon handoff from the foreign agent.

29. A method for binding comprising:
   generating an aggregated binding message to affect a binding state at a foreign agent of at least two HoA/HA pairs and a common address mapped to each of the at least two HoA/HA pairs at a same time, wherein the foreign agent is linked to a home agent; and
   transmitting the aggregated binding message to the foreign agent upon initial registration with the foreign agent.

30. A method for binding comprising:
   generating an aggregated binding message to affect a binding state at a foreign agent of a first and second HoA/HA pairs and a common address mapped to each of the first and second HoA/HA pairs at a same time, wherein the foreign agent is linked to a first and second home agents, the first HoA/HA pair is associated with the first home agent and the second HoA/HA pair is associated with the second home agent; and
   transmitting the aggregated binding message to the foreign agent upon initial registration with the foreign agent.

31. A method for binding comprising:
   generating an aggregated binding message to affect a binding state at a foreign agent of at least first, second and third HoA/HA pairs and a common address mapped to each of the at least first, second and third pairs at a same time, wherein the foreign agent is linked to a first and second home agents, the first and second HoA/HAs pairs is associated with the first home agent, and the third HoA/HA pair is associated with the second home agent; and
   transmitting the aggregated binding message to the foreign agent upon initial registration with the foreign agent.

32. A method for binding comprising:
   generating an aggregated binding message to affect a binding state at a new foreign agent of at least two HoA/HA pairs and a common address mapped to each of the at least two HoA/HA pairs at a same time, wherein the at least two HoA/HA pairs are associated with a home agent; and
   transmitting the aggregated binding message to the new foreign agent upon initial registration with the new foreign agent.

33. A method for binding comprising:
   generating an aggregated binding message to affect a binding state at a new foreign agent of at least two HoA/HA pairs and a common address mapped to each of the at least two HoA/HA pairs at a same time, wherein a first of the at least two HoA/HA pairs is associated with a first home agent and a second of the at least two HoA/HA pair is associated with a second home agent; and
   transmitting the aggregated binding message to the new foreign agent upon handoff from an old foreign agent to the new foreign agent.

34. A method for binding comprising:
   generating an aggregated binding message to affect a binding state, at least one home agent serving a handed off region, and a common address mapped to each of at least two HoA/HA pairs at a same time; and
   transmitting the aggregated binding message to the at least one home agent serving the handed off region upon handoff from a foreign agent.

35. A method for updating a binding table comprising:
   updating, in response to an aggregated binding message from an end node, entries in the binding table to affect a binding state associated with at least two HoA/HA pairs of an old access node and a common address mapped to each of the at least two HoA/HA pairs; and
   generating an aggregated update binding message to an old access node serving a previous visited region to affect a binding state at a same time of information in an old binding table of the old access node, including updating the common address with a new common address for mapping to each of at least two HoA/HA pairs associated with a new access node.

36. The method of claim 35, further comprising:
   receiving a message including at least one of policy state and MIP configuration information from the old access node in response to the aggregated binding message; and
   updating the binding table of the new access node with the at least one policy state and MIP configuration information.

37. The method of claim 35, wherein the new common address is a co-located care of address.

38. The method of claim 35, wherein the HoA addresses in each of the at least two HoA/HA pairs include at least one IPv4 and one IPv6 addresses served by a same home agent.

39. The method of claim 38, wherein the new common address is a co-located care of address associated with the at least one IPv4 and one IPv6 addresses.

40. The method of claim 35, wherein the new access node is a mobile router.

41. A method for updating a binding table comprising:
   updating a binding state in the binding table, in response to an aggregated binding update message from a new access node, with a new common address mapped to each of at least two HoA/HA pairs and with binding information for the at least two HoA/HA pairs associated with the new access node, the updating occurring at a same time for all the at least two HoA/HA pairs; and
   communicating at least one policy state and MIP configuration information from the binding table to the new access node in response to the aggregated binding update message.

42. The method of claim 41, wherein the new common address is a co-located care of address.

43. The method of claim 41, wherein the HoA addresses in each of the at least two HoA/HA pairs include at least one IPv4 and one IPv6 addresses served by a same home agent.

44. The method of claim 43, wherein the new common address is a co-located care of address associated with the at least one IPv4 and one IPv6 addresses.

45. The method of claim 41, wherein the new access node is a mobile router.

46. A method for updating an AAA server comprising:
updating an aggregated policy state for an end node served by a requesting access node in response to an aggregated message received from the requesting access node, the aggregated message including an end node identifier identifying the end node; and
generating an aggregated response message, including the end node identifier, an end node, AAA response state, and an address pair information a common address mapped to each of the for at least two HoA/HA pairs along with associated profiles to the requesting access node during a hand off on the basis of the aggregated message.

47. A computer-readable medium containing computer executable instructions to perform a method, the method comprising:
generating an aggregated binding message to affect a binding state at a foreign agent of at least two HoA/HA pairs and a common address mapped to each of the at least two HoA/HA pairs at a same time, wherein the foreign agents is linked to a home agent; and
transmitting the aggregated binding message to the foreign agent upon initial registration with the foreign agent.

48. A computer-readable medium containing computer executable instructions to perform a method, the method comprising:
generating an aggregated binding message to affect a binding state at a foreign agent of a first and second HoA/HA pairs and a common address mapped to each of the first and second HoA/HA pairs at a same time, wherein the foreign agent is linked to a first and second home agents, the first HoA/HA pair is associated with the first home agent and the second HoA/HA pair is associated with the second home agent; and
transmitting the aggregated binding message to the foreign agent upon initial registration with the foreign agent.

49. A computer-readable medium containing computer executable instructions to perform a method, the method comprising:
generating an aggregated binding message to affect a binding state at a foreign agent of at least first, second and third HoA/HA pairs and a common address mapped to each of the at least first, second and third pairs at a same time, wherein the foreign agent is linked to a first and second home agents, the first and second HoA/HAs pairs is associated with the first home agent, and the third HoA/HA pair is associated with the second home agent; and
transmitting the aggregated binding message to the foreign agent upon initial registration with the foreign agent.

50. A computer-readable medium containing computer executable instructions to perform a method, the method comprising:
generating an aggregated binding message to affect a binding state at a new foreign agent of at least two HoA/HA pairs and a common address mapped to each of the at least two HoA/HA pairs at a same time, wherein the at least two HoA/HA pairs are associated with a home agent; and
transmitting the aggregated binding message to the new foreign agent upon initial registration with the new foreign agent.

51. A computer-readable medium containing computer executable instructions to perform a method, the method comprising:
generating an aggregated binding message to affect a binding state at a new foreign agent of at least two HoA/HA pairs and a common address mapped to each of the at least two HoA/HA pairs at a same time, wherein a first of the at least two HoA/HA pairs is associated with a first home agent and a second of the at least two HoA/HA pair is associated with a second home agent; and
transmitting the aggregated binding message to the new foreign agent upon handoff from an old foreign agent to the new foreign agent.

52. A computer-readable medium containing computer executable instructions to perform a method, the method comprising:
generating an aggregated binding message to affect a binding state, at least one home agent serving a handed off region, and a common address mapped to each of at least two HoA/HA pairs at a same time; and
transmitting the aggregated binding message to the at least one home agent serving the handed off region upon handoff from a foreign agent.

53. A computer-readable medium containing computer executable instructions to perform a method, the method comprising:
updating, in response to an aggregated binding message from an end node, entries in the binding table to affect a binding state associated with at least two HoA/HA pairs of an old access node and a common address mapped to each of the at least two HoA/HA pairs; and
generating an aggregated update binding message to an old access node serving a previous visited region to affect a binding state at a same time of information in an old binding table of the old access node, including updating the common address with a new common address for mapping to each of at least two HoA/HA pairs associated with a new access node.

54. The method in claim 53, further comprising:
receiving a message including at least one of policy state and MIP configuration information from the old access node in response to the aggregated binding message; and
updating the binding table of the new access node with the at least one policy state and MIP configuration information.

55. The method in claim 53, wherein the new common address is a co-located care of address.

56. The method in claim 53, wherein the HoA addresses in each of the at least two HoA/HA pairs include at least one IPv4 and one IPv6 addresses served by a same home agent.

57. The method in claim 56, wherein the new common address is a co-located care of address associated with the at least one IPv4 and one IPv6 addresses.

58. The method in claim 53, wherein the new access node is a mobile router.

59. A computer-readable medium containing computer executable instructions to perform a method, the method comprising:
updating a binding state in the binding table, in response to an aggregated binding update message from a new access node, with a new common address mapped to each of at least two HoA/HA pairs and with binding information for the at least two HoA/HA pairs associated with the new access node, the updating occurring at a same time for all the at least two HoA/HA pairs; and communicating at least one policy state and MIP configuration information from the binding table to the new access node in response to the aggregated binding update message.

60. The computer-readable medium in claim 59, wherein the new common address is a co-located care of address.

61. The computer-readable medium in claim 59, wherein the HoA addresses in each of the at least two HoA/HA pairs include at least one IPv4 and one IPv6 addresses served by a same home agent.

62. The computer-readable medium in claim 61, wherein the new common address is a co-located care of address associated with the at least one IPv4 and one IPv6 addresses.

63. The computer-readable medium in claim 59, wherein the new access node is a mobile router.

64. A computer-readable medium containing computer executable instructions to perform a method, the method comprising:

updating an aggregated policy state for an end node served by a requesting access node in response to an aggregated message received from the requesting access node, the aggregated message including an end node identifier identifying the end node; and generating an aggregated response message, including the end node identifier, an end node, AAA response state, and an address pair information for a common address mapped to each of the at least two HoA/HA pairs along with associated profiles to the requesting access node during a hand off on the basis of the aggregated message.

* * * * *